Oct. 20, 1970 R. A. CLIFF 3,535,560

DATA PROCESSOR HAVING MULTIPLE SECTIONS ACTIVATED AT DIFFERENT TIMES BY SELECTIVE POWER COUPLING TO THE SECTIONS

Filed June 9, 1967 4 Sheets-Sheet 1

INVENTOR
Rodger A. Cliff

BY

ATTORNEYS

DATA PROCESSOR HAVING MULTIPLE SECTIONS ACTIVATED AT DIFFERENT TIMES BY SELECTIVE POWER COUPLING TO THE SECTIONS

Filed June 9, 1967

INVENTOR
Rodger A. Cliff
BY
ATTORNEYS

Oct. 20, 1970 R. A. CLIFF 3,535,560
DATA PROCESSOR HAVING MULTIPLE SECTIONS ACTIVATED AT
DIFFERENT TIMES BY SELECTIVE POWER
COUPLING TO THE SECTIONS
Filed June 9, 1967 4 Sheets-Sheet 3

INVENTOR
Rodger A. Cliff
BY
ATTORNEYS

Oct. 20, 1970 R. A. CLIFF 3,535,560
DATA PROCESSOR HAVING MULTIPLE SECTIONS ACTIVATED AT
DIFFERENT TIMES BY SELECTIVE POWER
COUPLING TO THE SECTIONS
Filed June 9, 1967 4 Sheets-Sheet 4

INVENTOR
Rodger A. Cliff
BY
ATTORNEYS

United States Patent Office 3,535,560
Patented Oct. 20, 1970

3,535,560
DATA PROCESSOR HAVING MULTIPLE SECTIONS ACTIVATED AT DIFFERENT TIMES BY SELECTIVE POWER COUPLING TO THE SECTIONS

Rodger A. Cliff, College Park, Md., assignor to the United States of America as represented by the Administrator of the National Aeronautics and Space Administration Filed June 9, 1967, Ser. No. 645,584
Int. Cl. H03k *1/00*
U.S. Cl. 307—296 11 Claims

ABSTRACT OF THE DISCLOSURE

Disclosed is a multisection computer, wherein operating power is supplied intermittently to each of the several sections. Data are transferred between sections by simultaneously supplying power for a relatively short time duration to the sections involved in the data transfer. Power is switched to the sections by the emitter-collector path of a transistor that remains ON after a control waveform has terminated. Steel leading and trailing edges of the control waveform are converted to sloping edges of the switched power waveform by connecting a capacitor in shunt with the base collector electrodes of the switching transistor. The switching transistor stays in a conducting state after the control voltage waveform has terminated with a capacitor and idode circuitry in the base circuit of a control transistor for the switching transistor.

The invention described herein was made by an employee of the United States Government and may be manufactured and used by or for the Government for governmental purposes without the payment of any royalties thereon or therefor.

The present invention relates generally to data processing equipment and more particularly to a data processor including a plurality of separate sections intermittently supplied with power, whereby data are transferred between sections by supplying power to the sections for relatively short time intervals.

In many applications, e.g. outer space systems, it is required for relatively complex data processing equipment to consume minimum amounts of power. In addition, the amount of circuitry employed must be kept at an extremely low level to minimize the space and weight requirements of a package, such as an earth orbiting satellite.

While integrated circuits have solved the problems incident with space requirements, to a great extent these circuits have increased equipment power requirements. For example, a specific integrated circuit flip-flop consumes 3 milliwatts of power while a similar discrete component transistor flip-flop requires only 500 microwatts of power, a difference in power requirements of approximately an order of magnitude. Hence, integrated circuits have reduced the size and weight of electronic components but have necessitated the use of larger power supplies than discrete components, whereby the size and weight advantages of integrated circuits have not necessarily been realized in large scale circuitry such as data processors.

In outer space applications, therefore, the size and weight of batteries and solar cells must be increased to power complex integrated circuit systems so that the saving in weight and space attributed to the integrated circuit package may be more than offset.

According to the present invention, these disadvantages in the prior art are overcome by providing a data processor including a plurality of sections, each intermittently responsive to a D.C. power supply. Sections coupling data between each other are simultaneously supplied with power for a relatively short time duration, whereby data are transfererd from one section to another only during the time interval when both sections are supplied with power.

To assure accurate and positive activation of sections having flip-flops, at the beginning of each operation of a particular section, a reset pulse is applied to each of the flip-flops in the section simultaneously with the application of power to that section. The reset pulse has a duration less than the simultaneous activation interval of two sections, whereby coupling of zero and finite voltages to a section receiving power is accomplished, without the general prior art requirement of gates between adjacent data processor sections. Hence, the present invention reduces the power requirements of a data processor because the several sections of the processor are not continuously supplied with energization power, while reducing circuit requirements through the elimination of data transfer gates. Eliminating data transfer gates further reduces the power requirements of the equipment in many cases, because such gates frequently include active elements.

A problem incident with intermittently supplying power to sections of a digital data processor concerns the transients produced by rapidly applying or removing power. Proper operation cannot be obtained until these transients die out. To obviate this problem, a feature of the present invention is that the steep leading and trailing edges of the switched power waveform are modified so that they have a significant slope. The slope of the switched power is chosen to minimize transient disturbances.

A further aspect of the invention concerns the specific circuitry utilized for intermittently coupling power from a D.C. source to the power input terminals of the separate computer sections. To this end, the power supply is connected to the computer sections through a plurality of switching networks, each including the emitter-collector path of a switching transistor. The switching transistor is selectively gated into cut off and saturation in response to a control voltage having steep leading and trailing edges.

The control voltage is applied to a control transistor, having its emitter-collector path connected to the base of the switching transistor. The trailing edge of the control voltage is delayed by a diode capacitor network connected in the base circuit of the control transistor. Thereby, the switching transistor for one section remains activated while the switching transistor of another section is energized by the leading edge of the control voltage that occurs simultaneously with the trailing edge of the control voltage applied to the first section being considered.

The steep leading and trailing edges of the control voltage waveform, as derived at the collector of the control transistor, are converted in the power supplied to the different sections into sloping waveforms by connecting a capacitor between the base and collector electrodes of the switching transistor. The reset voltage pulse, derived concurrently with the leading edge of the power supplied to each section, is generated by connecting a transistor to the capacitor connected between the switching transistor base and the collector electrodes; whereby the amplifying transistor is forward biased only in response to the transient current flowing through the capacitor in response to the leading edge of the control voltage. Thereby, a single, relatively simple circuit provides switching power having sloping leading and trailing edges to the computer sections, while feeding reset pulses to the section and delaying the turn off time of the section beyond the trailing edge of the control voltage.

It is, accordingly, an object of the present invention to provide a new and improved data processor including a plurality of sections that are only intermittently supplied with power.

It is another object of the present invention to provide a new and improved data processor requiring smaller amounts of power and fewer components than prior art data processors because power is only intermittently supplied to all active components.

An additional object of the present invention is to provide a new and improved multisection data processor wherein data transfer between sections is accomplished without gates.

Still another object of the present invention is to provide a new and improved multisection data processor wherein data are switched between sections in response to feeding power intermittently to the sections.

Still another object of the present invention is to provide a new and improved circuit for deriving a reset pulse substantially simultaneously with the application of power through a switch to a data processing section.

Yet another object of the present invention is to provide a new and improved circuit for maintaining a power switch in an activated condition subsequent to the termination of a control signal.

Still another object of the present invention is to provide a new and improved multisection computer wherein power is intermittently fed to the several sections of the computer and the problems of transients in coupling power to the sections are obviated.

Still another object of the present invention is to provide a new and improved circuit for converting the steep leading and trailing edges of a control voltage to a power waveform having tapering leading and trailing edges.

The above and still further objects, features and advantages of the present invention will become apparent upon consideration of the following detailed description of one specific embodiment thereof, especially when taken in conjunction with the accompanying drawings, wherein.

Figure 1:
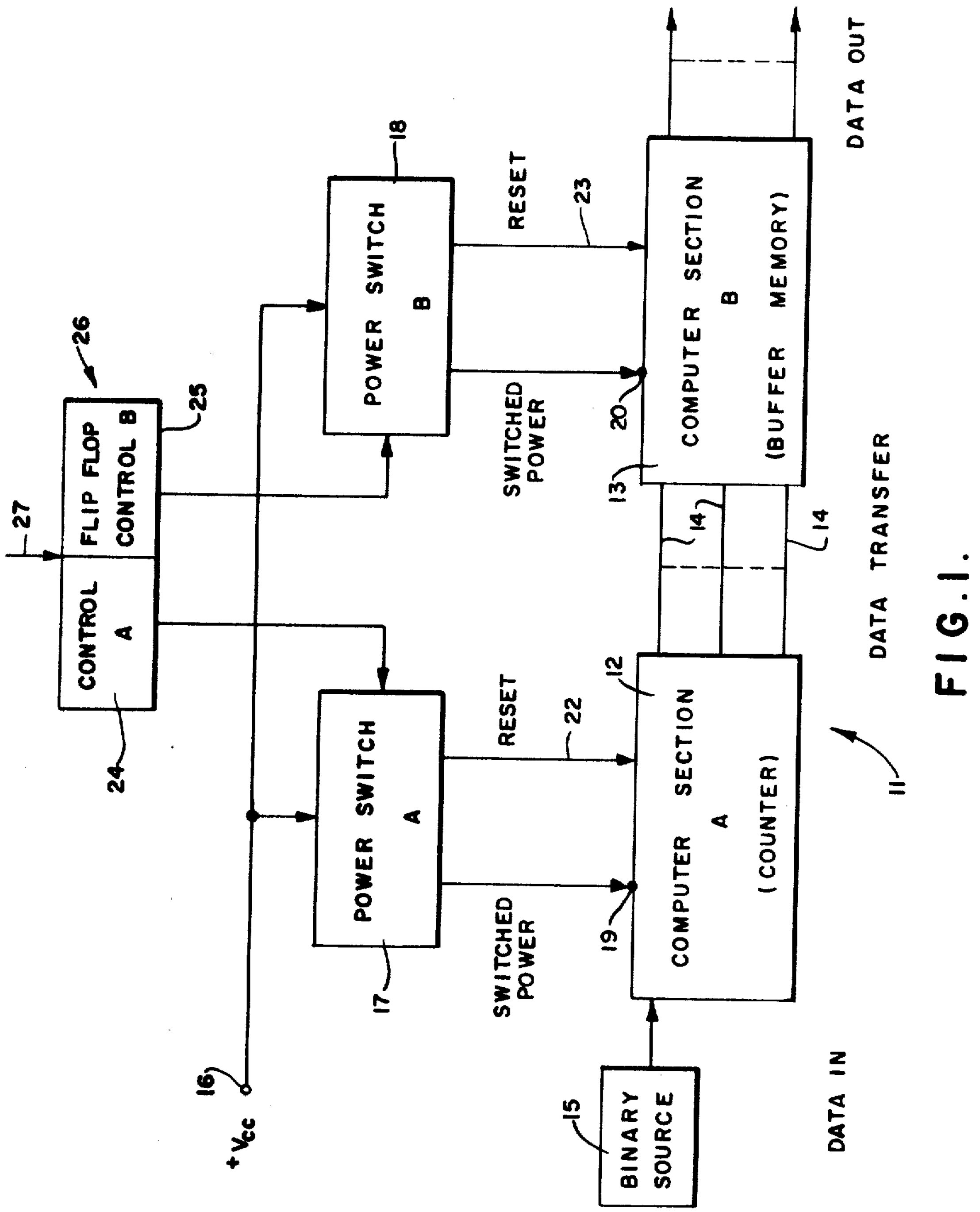
FIG. 1 is a block diagram illustrating the principles of the present invention.

Reference is now made specifically to FIG. 1 of the drawings, wherein data processor 11 is illustrated as comprising cascaded sections 12 and 13, connected together by a plurality of leads 14. Data processing section 12 is responsive to a data source, such as serial binary source 15. In the specifically described and illustrated embodiment of the invention, computer section 12 is a multistage, multi-output counter, including a plurality of cascaded flip-flop stages, while data processor section 13 is a buffer memory comprising a plurality of independent flip-flops, each responsive to a separate one of the outputs of section 12. While data processor 11 is described specifically as comprising counter and buffer memory stages 12 and 13, respectively, it is to be understood that the data processor may comprise any suitable equipment wherein data are transferred simultaneously from one section to another, and only one section is operating at a time. In addition, data source 15 can be of the parallel, rather than serial, type, in which case computer section 12 includes a plurality of inputs simultaneously responsive to a like number of binary data sources.

In the specifically considered data processor, computer section 12 is activated for a selected time interval to respond to pulses from binary source 15, whereby at the termination of the time interval, certain of the flip-flops in counter 12 have binary zero outputs while others have binary one outputs. The binary zero and one output voltages of the several flip-flop stages included within counter 12 are represented by the derivation of zero and positive, finite voltages on output leads 14.

The voltages on leads 14 are applied to computer section or buffer memory 13. Buffer memory 13 is activated substantially simultaneously with the completion of the selected operating time interval of counter 12 while counter section 12 is deactivated, i.e., has input power removed from it, a short period after the selected time interval has elapsed. To these ends, power is selectively applied from the D.C. positive voltage source connected to terminal 16 through power switches 17 and 18 to the excitation or input terminals 19 and 20 of counter 12 and memory 13, respectively.

Substantially simultaneously with the application of power by switches 17 and 18 to terminals 19 and 20, reset control pulses are applied to counter 12 and memory 13 by power switches 17 and 18 via leads 22 and 23, respectively. The reset pulses on leads 22 and 23 supply pulses to counter 12 and buffer memory 13 to invariably return the counter and memory flip-flops to the same initial condition if no input signal is applied to the data processor sections. Thereby, all of the flip-flop stages of counter 12 are invariably returned to the zero state with the application of power to the counter; those flip-flops in memory 13 that have zero voltages fed thereto when the memory is supplied with power are positively driven to a zero state.

Control of power switches 17 and 18 is in response to out of phase signals derived from complementary stages 24 and 25 of flip-flop 26. Flip-flop 26 is driven in response to control pulses applied thereto on lead 27, whereby a positive voltage is always derived from stage 24 while a zero voltage is derived from stage 25, and vice versa. Power switches 17 and 18 respond to the out of phase rectangular waves applied thereto so that the leading edge of power applied by each of the switches to its corresponding data processor section occurs simultaneously with the application of a positive going leading edge from flip-flop 26 to the respective power switch.

Power is fed from terminal 16 through power switches 17 and 18 to power input terminals 19 and 20 of data processor sections 12 and 13 throughout the interval when a positive voltage is applied to the particular power switch from flip-flop 26. In addition, power remains coupled through switches 17 and 18 from terminal 16 to both input terminals 19 and 20 for a short period subsequent to the trailing edge of the control voltage applied to the particular power switch. During this period of simultaneous activation of sections 12 and 13, data are transferred from counter 12 to buffer memory 13 via leads 14. The data transfer between sections 12 and 13 is accomplished without the need for space and power consuming gates between the two sections.

Figure 2:
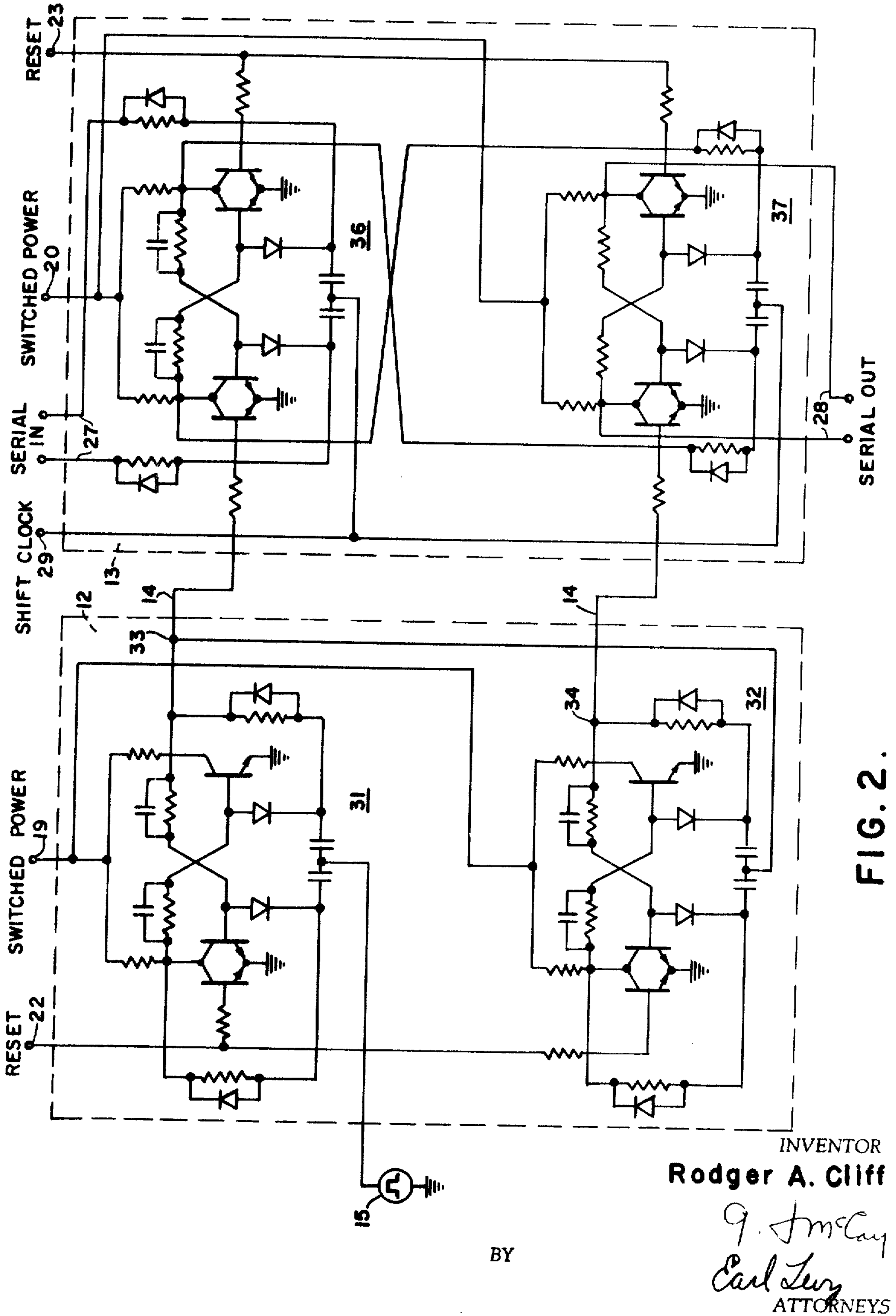
FIG. 2 is a circuit diagram illustrating exemplary circuits utilized in the system of FIG. 1.

To provide a more specific description of the system illustrated by FIG. 1, reference is made to FIG. 2 of the drawings. In FIG. 2, counter 12 is illustrated as specifically including the first two stages 31 and 32 of bistable flip-flops cascaded together. Stage 31 is directly responsive to binary data source 15, while the signal input terminal of stage 32 is coupled to the output terminal 33 of stage 31. Voltages derived at the output terminals 33 and 34 of stages 31 and 32, respectively, are coupled to output leads 14 of counter 12 and supply input signals to flip-flops 36 and 37, respectively, of buffer memory 13.

Power is selectively supplied to all of the transistors within counter 12 from power input terminal 16 by power switch 17 and terminal 19, while selective coupling of power to each of the transistors in buffer memory 13 is from terminal 16 via the connection through power switch 18 to terminal 20.

Reset pulses are applied to the input terminals of flip-flops 31 and 32 of counter 12 substantially simultaneously with the application of power to terminal 19. Each reset pulse subsists for a relatively short time compared to the period of power application to terminal 19. In a similar manner, flip-flops 36 and 37 are supplied with short duration reset pulses from terminal 23 substantially simultaneously with the initial application of power to terminal 20 of the buffer memory 13. The positive reset pulses applied to terminal 22 drive the left hand transistors of flip-flops 31 and 32 into a conducting, saturated state while power is being supplied to terminal 19. Thereby, the transistors on the left side of flip-flops 31 and 32 are rendered conducting, to the exclusion of the transistors on the right side, and all of the stages in counter 12 are driven to a zero state prior to the commencement of a counting operation.

Counting of pulses from source 15 begins after the left transistors of flip-flops 31 and 32 have been driven to a conducting state and the transistors in counter 12 are supplied with power and continues throughout the interval defined by a positive output voltage from the flip-flop stage 24, FIG. 1. After flip-flop stage 24 reverts to a zero output voltage, in response to a control signal on lead 27, signals in the counter flip-flops are coupled to buffer memory 13. The states of flip-flops 31 and 32, at terminals 33 and 34, are coupled via leads 14 to the input terminals of flip-flops 36 and 37 of buffer memory 13 in the interval immediately after flip-flop 26, FIG. 1, is switched. Such coupling occurs because power is supplied to power input terminals 19 and 20 of both counter 12 and buffer memory 13 for a short time after flip-flop 26 is activated.

Each of the flip-flops 36 and 37 in buffer memory 13 is invariably maintained in the same state during the initial portion of the interval when both sections 12 and 13 are energized by virtue of the reset pulse applied to terminal 23. The reset pulse applied to terminal 23 energizes the transistors on the right side of flip-flops 36 and 37 into the conducting state, whereby the transistors on the left side are driven to cut off. The reset pulse at terminal 23, however, subsists for a relatively short time interval compared to the period of simultaneous activation of sections 12 and 13, whereby a positive voltage on lead 14 drives the transistor on the left side of flip-flops 36 and 37 into a conducting state. If, however, the voltage on lead 14 is at a zero level, the reset pulse on lead 23 has definitely established a binary zero state in flip-flops 36 and 37. Thus, the flip-flop stages accurately store an indication of the states of counter flip-flops 31 and 32.

As shown by way of example in FIG. 2, buffer memory 13 is connected in a shift register configuration. Thus, during the interval when the counter 12 is deenergized and buffer memory 13 is energized the accumulated count which has been transferred from counter 12 to buffer memory 13 may be read out of buffer memory 13 at the serial output terminals 28 in response to shift clock pulses applied to buffer memory 13 at terminal 29. Other serial data may be simultaneously inserted in buffer memory 13 at the serial input terminals 27.

Figure 3:
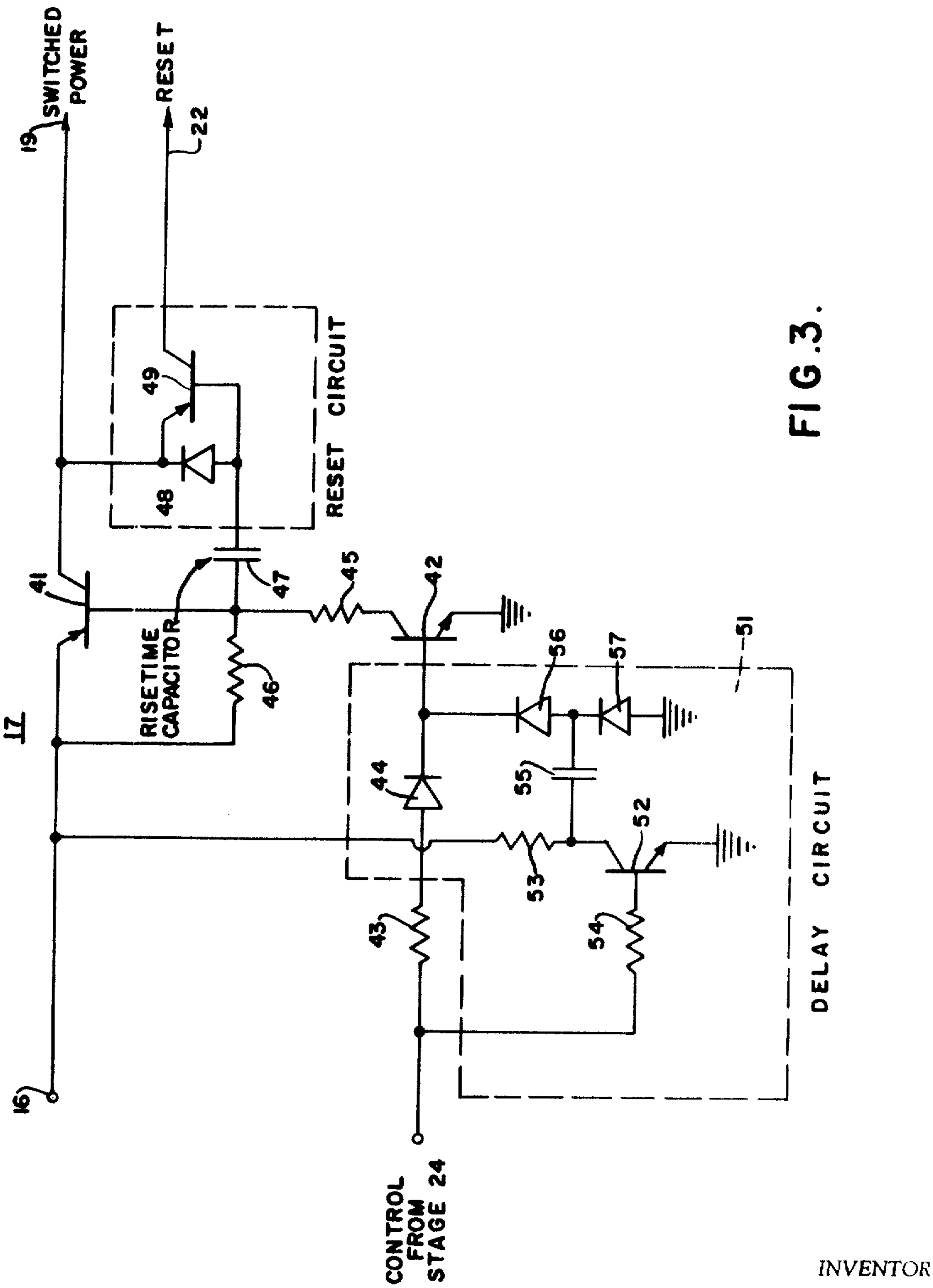
FIG. 3 is a circuit diagram of a preferred embodiment of the power switch illustrated in FIG. 1.

Reference is now made to FIG. 3 of the drawings, wherein there is illustrated a circuit diagram of a preferred form of each of power switches 17 and 18. For purposes of illustration in a specific manner, it is assumed that the circuit of FIG. 3 is power switch 17 for switching the positive voltage at terminal 16 to power input terminal 19 of counter section 12 and for deriving reset pulses on lead 22. Of course, the circuitry of power switch 18, coupled to terminal 22 and reset lead 23, is identical with the circuit illustrated in FIG. 3.

The voltage at D.C. power supply terminal 16 is selectively coupled through the emitter collector path of PNP transistor 41. Conduction through the emitter collector path of power handling transistor 41 is selectively responsive to the conduction path established through the emitter collector path of NPN transistor 42, connected in the common emitter mode. The base of the latter transistor is response to the positive rectangular voltage derived from stage 24 of flip-flop 26 via the series connection of resistor 43 and the forward bias path of diode 44.

During the interval when the output voltage of stage 24 is positive, the base emitter junction of transistor 42 is forward biased to saturation, whereby current flows from terminal 16 through the base emitter junction of transistor 41, resistor 45 and the emitter collector path of transistor 42 to ground. Sufficient current flows from the base of transistor 41 while transistor 42 is forward biased to drive the power handling transistor into a heavily conducting saturated state, whereby an impedance on the order of 1 ohm subsists between the emitter and collector of the power handling transistor.

During the interval when the emitter base junction of transistor 42 is back-biased, in response to a zero voltage being derived from stage 24 of flip-flop 26 only leakage current flows to the emitter collector path of the control transistor. The leakage current is supplied from terminal 16 through resistor 46, whereby virtually no current is drawn from the base of transistor 41 and the power handling transistor is driven to cut off. During cut off, insufficient current is supplied by transistor 41 to the power input terminal 19 of counter 12 to energize any of the transistors in the counter circuit. During the interval when transistor 41 is cut off, dissipation of power within the transistor stages of counter 12 is obviated, whereby power requirements of the counter circuit are reduced.

It is desirable to apply and remove power to the sections of the processor gradually, rather than suddenly, to minimize transient disturbances. To this end, capacitor 47 is connected in a Miller type circuit between the base and collector of switching transistor 41. Capacitor 47 is connected in series with the electrodes of diode 48, included for a purpose seen infra. In operation, capacitor 47 functions substantially as an integrating capacitor, whereby the steep leading and trailing edges of the voltage at the collector of transistor 42 is translated, at terminal 19, into a waveform that is substantially trapezoidal in shape. The sloping edges of the trapezoidal waveform derived at terminal 19 are derived in the interval between switching transistor 41 from a cut off to a saturated condition and vice versa. Of course, during the time interval when transistor 41 is saturated, substantially all of the voltage at terminal 16 is coupled to terminal 19 through the emitter collector path of transistor 41, without any substantial change in shape or amplitude.

To derive a reset pulse, of relatively short duration and of sufficient current to drive each of the stages in counter 12, PNP transistor 49 is connected so that its base emitter junction feeds current from the collector of transistor 41 to capacitor 47 in response to the leading edge of the positive going voltage developed at the collector of transistor 42. Diode 48 is connected in shunt with the base emitter junction of transistor 49 in such a manner that the transistor base emitter junction and the diode junction are connected with opposite forward directions of biasing.

During the interval when a sudden transition occurs at the collector of transistor 42 in response to the positive going leading edge of the flip-flop stage 24 output voltage, current is supplied from terminal 16 through the emitter collector path of transistor 41 to the emitter base junction of transistor 49 and the electrodes of capacitor 47 to ground through the emitter-collecor path of transistor 42. In response to the charging current supplied by the base of transistor 49 to capacitor 47, the transistor is forward biased and feeds a substantial amount of current to "reset" lead 22. The amount of current supplied by the collector of transistor 49 to lead 22 during the stated interval is sufficiently great to drive each of the transistors in counter 12 connected to lead 22 to a reset saturated state. In response to transistor 41 being driven to saturation, however, charging of capacitor 47 discontinues, transistor 49 is no longer forward biased and no current is supplied to lead 22 by transistor 49. Hence, the duration of the positive current pulse on lead 22 is equal to the charging interval of capacitor 47.

The connection of capacitor 47 to the base of transistor 49 prevents current from being supplied to lead 22 in response to the trailing edge of the power waveform coupled to terminal 19. Current is not coupled to terminal 19 because transistor 49 is back-biased in response to the flow of current from capacitor 47 to the collector of transistor 41 during the negative going, trailing edge of the power waveform applied to terminal 19 and relatively low forward bias impedance of diode 48, shunting the base emitter junction of transistor 49.

As indicated supra, power is supplied to terminal 19 from terminal 16 after stage 24 of flip-flop 26 has been activated from the positive to the zero voltage level. Maintaining transistor 41 conducting after the trailing edge of the waveform derived by stage 24 has occurred is accomplished with delay circuit 51, coupled between the output terminal of flip-flop stage 24 and the base emitter junction of transistor 42.

Delay circuit 51 includes a phase inverting, NPN transistor 52, connected in the common emitter mode, whereby its emitter-collector path is supplied with power from terminal 16 through load resistor 53. The base emitter junction of transistor 52 responds to the positive and zero voltage levels derived from flip-flop stage 24 through isolating resistor 54, whereby the voltage at the collector of transistor 52 is an amplified, inverted replica of the output of flip-flop stage 24. The voltage at the collector of transistor 52 is coupled through capacitor 55 to the common terminal of diodes 56 and 57, the anode-cathode paths of which are connected in shunt with the base emitter junction of transistor 42.

The positive-going leading edge of the wave form derived from the flip-flop stage 24 drives transistor 52 of delay circuit 51 into saturation, whereby capacitor 55 is discharged through transistor 52 and diode 57. Diode 56 is back biased and therefore delay circuit 51 has no effect on the drive to transistor 42 from control stage 24 through resistor 43 and forward biased diode 44.

Delay circuit 51, however, responds to the negative going, trailing edge of the waveform derived from flip-flop stage 24 to introduce a substantial time delay between the occurrence of the negative going output of flip-flop stage 24 and switching of transistors 41 and 42. The delay on the negative going, trailing edge of the output of flip-flop stage 24 occurs because the voltage at the collector of transistor 52 rises as the voltage at its base decreases. The increased voltage at the collector of transistor 52 is coupled through capacitor 55 and the anode-cathode path of diode 56 to the base of transistor 42, whereby the emitter ocllector path of transistor 42 remains forward biased subsequent to the negative going transition in the output voltage of flip-flop stage 24. Current continues to flow from the collector of transistor 52 through capacitor 55, diode 56 to the emitter base junction of transistor 42 for a substantial time period after transistor 52 has been cut off by virtue of the relatively long time constant circuit defined by resistor 53 and capacitor 55, as connected to the D.C. power supply at terminal 16. After capacitor 55 has been almost completely charged by the D.C. voltage at terminal 16 transistor 42 is switched to a cut off condition and the power supplied to terminal 19 decreased, as controlled by capacitor 47.

To provide a more complete understanding and summary of the present invention, a cycle of operation will be considered by referring to the waveforms illustrated by FIG. 4.

Figures 4A, 4B, 4C, 4D, 4E, 4F, 4G:
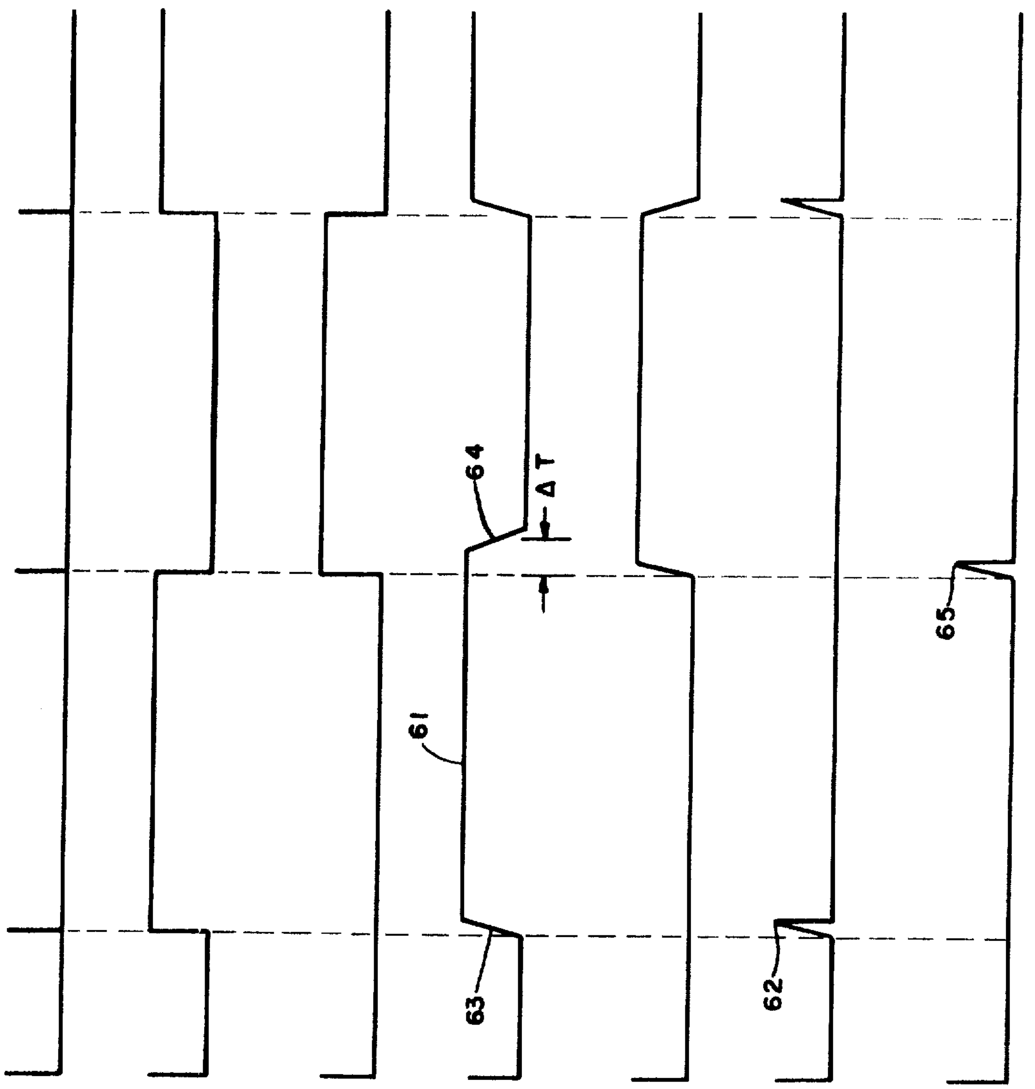
FIGS. 4A–4G are an illustration of a plurality of waveforms derived with the circuitry of FIGS. 1–3.

As indicated by FIG. 4A, short duration control pulses are applied to flip-flop 26 via lead 27 to define the operating intervals of counter section 12 and buffer memory section 13. In response to the first control pulse on lead 27, flip-flop 26 is activated, whereby a rectangular voltage, FIG. 4B, is derived from flip-flop section 24. The rectangular voltage derived from flip-flop section 24 is applied to power switch 17, causing transistor 42 thereof to be turned on.

In response to transistor 42 being activated to a conducting state, capacitor 47 is charged by current flowing from the collector of transistor 41 via the base emitter junction of transistor 49. Current continues to flow to capacitor 47 until the emitter collector path of transistor 41 is saturated, as indicated by the waveform of FIG. 4D. Once saturation of transistor 41 occurs, voltage coupled between terminals 16 and 19 remains constant, as indicated by flat portion 61 of the FIG. 4D waveform.

During the interval while transistor 41 is being switched from a cut off to a saturated condition, transistor 49 is forward biased in response to the current flowing through its base emitter junction to the electrodes of capacitor 47, whereby substantial current is applied to the flip-flops of counter 12 via lead 22, as indicated by the short duration pulse 62, FIG. 4F. It is noted that the slope and duration of pulse 62 are substantially identical with the slope and duration of waveform segment 63 of the switched power applied to terminal 19. This relationship occurs since transistor 49 is rendered conducting only while capacitor 47 is charging, and the capacitor charges only during the transition of transistor 41 between a cut off and saturated condition.

In response to the pulse of FIG. 4F, flip-flops 31 and 32 of counter 12 are reset to the zero state, to enable the counter to provide an accurate indication of the number of pulses in binary wave train 15. After the flip-flop stages of counter 12 have been reset, a constant voltage is applied by terminal 19 to the emitter collector paths of each of the transistors in counter 12. Counter 12 functions in a normal manner while power is supplied to its power input terminal 19 to count the number of pulses in wave train 15.

In response to the second control pulse, FIG. 4A, applied to flip-flop 26, the flip-flop changes state, whereby rectangular waveforms of FIGS. 4B and 4C are derived from stages 24 and 25. The changes in voltage generated by stages 24 and 25 have no effect on transistor 42, and it continues to conduct in response to the current supplied to it by the voltage at terminal 16 through diode 56, capacitor 55 and resistor 53. The forward bias condition of transistor 42 is maintained during the interval between the occurrence of the second pulse applied to flip-flop 27, FIG. 4A, and the beginning of the negative going portion 64 of the power waveform switched through transistor 41 of switch 17, FIG. 4D.

While transistor 41 within power switch 17 is activated in the interval, ΔT, FIG. 4D, the corresponding power switching transistor of power switch 18 is activated, whereby power is supplied to counter 12 and buffer memory 13 simultaneously. Druing the period of simultaneous application of power to terminals 19 and 20 of counter 12 and buffer memory 13, the states of flip-flop 31 and 32 are transferred to the input terminals of buffer flip-flops 36 and 37. Buffer flip-flops 36 and 37, however, are at the same time activated so that the transistors on the right side of each are driven to the saturated condition by reset pulse 65, FIG. 4G. The trailing edge of reset pulse 65 occurs prior to the beginning of trailing edge 64 of the waveform of FIG. 4D, whereby power is applied to both of counter 12 and buffer memory 13 in a stable manner simultaneously and positive transfer of data between the two stages is accomplished.

In the manner indicated, supra, for activation of power switch 17, power switch 18 is supplied with rectangular control voltages by flip-flop stage 25, as indicated by FIG. 4C. Power is switched between terminal 16 and power input terminal 20 of buffer memory 13 through power switch 18 with a waveform as indicated by FIG. 4E.

In response to the third pulse coupled to flip-flop 26 by lead 27, the flip-flop is returned to its initially described condition, wherein a positive voltage is derived from stage 24 while a zero voltage is coupled by stage 25 to the input terminal of power switch 18. A new activation cycle for counter 12 is begun with power being supplied only to counter 12, to the exclusion of buffer memory 13.

While I have described and illustrated one specific embodiment of my invention, it will be clear that variations of the details of construction which are specifically illustrated and described my be made without departing from the true spirit and scope of the invention as defined in the appended claims.

What is claimed is:

1. A digital data processor comprising a plurality of separate data processing stages, a power supply for all of said stages, means for coupling power from said supply to one of said stages while decoupling at least another of said stages from said supply and for, at some other time, coupling power from said supply to said another stage while decoupling power from said supply to said one stage, said power coupling means further including means for coupling power from said supply to said one and another stages simultaneously, means for connecting said one and another stages together in data signal exchange relationship only while said one and another stages are simultaneously coupled to said supply, and wherein said data signals are only bi-level said stages including bi-stable input responsive means, and means for driving all of said bi-stable means of said one stage into a first predetermined state and said connecting means activating selected ones of the bi-stable means of said one stage to a second state after the bi-stable means of said one stage have been driven to said first state.

2. The data processor of claim 1 wherein said means for driving includes a source of reset pulses having trailing edges occurring while said one and another stages are simultaneously coupled to said supply.

3. The data processor of claim 2 wherein said power coupling means for the one stage includes the emitter collector path of a first transistor means for selectively driving said path from a saturated to a cut-off condition.

4. The data processor of claim 3 wherein said means for selectively driving includes the emitter collector path of a second transistor of opposite conductivity type from said first transistor, the emitter collector path of said second transistor being connected to the base of said first transistor to selectively provide low and high impedance paths to said first transistor base in response to control voltages from a bi-level source.

5. The data processor of claim 4 further including means for driving the second tarnsistor emitter collector path to a low impedance substantially simultaneously with the leading edge of transitions of said control voltage, and delay means for driving the second transistor emitter collector path to a high impedance a predetermined time subsequent to the trailing edge of transitions of said control voltage, the power coupling means for said another stage being activated to connect said supply to said another stage substantially simultaneously with the derivation of the trailing edge of transitions of said control voltage.

6. The data processor of claim 5 wherein said delay means includes a third transistor of the same conductivity type as said second transistor, means connecting the emitter collector path of said third transistor to said power supply, means for driving the emitter collector path of said third transistor to the low and high impedance states in response to the leading and trailing edges, respectively, of said control voltage, a capacitor connected to the collector of said third transistor and charged by said supply, means for connecting said capacitor in series with the emitter collector path of said third transistor to be discharged in response to the leading edge of said control voltage and for charging said capacitor through the emitter base junction of said second transistor in response to the trailing edge of said control voltage.

7. The data processor of claim 6 wherein said capacitor connecting means includes a pair of series connected diodes shunting the emitter base junction of said second transistor, said diodes being poled in the same direction and being connected so they are back biased while the base emitter junction of the second transistor is forward biased, said capacitor being connected to a tap between said diodes.

8. The data processor of claim 7 further including another diode connected in series between said control voltage source and the base of said second transistor, said another diode and the base emitter junction of said second transistor being connected to be forward biased in response to the leading edge transition of said control voltage.

9. The data processor of claim 4 wherein said reset pulse source includes a capacitor connected to the base and collector of said first transistor, said capacitor being charged and discharged by said supply in response to said first transistor being driven to cut-off and saturation, and means responsive to said reset pulse source for deriving said reset pulse in response to said capacitor having a charge transition only in response to said first transistor being driven to saturation.

10. The data processor of claim 9 wherein said reset pulse deriving means includes a third transistor having its emitter and base connected in series circuit with one electrode of said capacitor and the collector of said first transistor, so that the emitter collector path of the third transistor is driven to a low impedance state only in response to said capacitor having a charge transition in response to said first transistor being driven to saturation.

11. The data processor of claim 10 further including a diode shunting the emitter base junction of said third transistor, said diode being poled so that it is forward biased while the emitter base junction of the third transistor is back biased, whereby power is coupled to said stages by said supply with sloping edges.

References Cited

UNITED STATES PATENTS

| | | | |
|---|---|---|---|
| 2,991,374 | 7/1961 | Miranda et al. | 307—221 |
| 3,007,060 | 10/1961 | Guenther | 307—293 X |
| 3,226,574 | 12/1965 | Winkler | 307—226 X |
| 3,248,566 | 4/1966 | Quinlan | 307—221 |
| 3,252,009 | 5/1966 | Weimer | 307—221 |
| 3,274,555 | 9/1966 | Luke | 307—221 X |
| 3,283,173 | 11/1966 | Marcus | 307—225 X |
| 3,289,010 | 11/1966 | Bacon et al. | 307—221 |
| 3,396,282 | 8/1968 | Sheng et al. | 307—208 |

STANLEY D. MILLER, Primary Examiner

U.S. Cl. X.R.

307—246, 247, 253, 263, 292, 293; 340—172.5